United States Patent [19]

Yakami

[11] Patent Number: 5,278,391
[45] Date of Patent: Jan. 11, 1994

[54] UNBALANCE CORRECTION METHOD FOR ROTATING BODY

[75] Inventor: Noboru Yakami, Neyagawa, Japan

[73] Assignee: Kabushiki Kaisha Daikin Seisakusho, Osaka, Japan

[21] Appl. No.: 861,898

[22] PCT Filed: Nov. 14, 1991

[86] PCT No.: PCT/JP91/01554
§ 371 Date: Jun. 25, 1992
§ 102(e) Date: Jun. 25, 1992

[87] PCT Pub. No.: WO92/09826
PCT Pub. Date: Jun. 11, 1992

[30] Foreign Application Priority Data

Nov. 21, 1990 [JP] Japan .................. 2-319912

[51] Int. Cl.[5] ............................ B23K 9/04
[52] U.S. Cl. ................... 219/137 R; 219/76.15
[58] Field of Search ............ 219/137 R, 76.14, 76.15; 118/669

[56] References Cited

U.S. PATENT DOCUMENTS

| | | | |
|---|---|---|---|
| 1,489,699 | 4/1924 | David | 219/137 R |
| 4,295,032 | 10/1981 | Sasaki | 219/137 R |
| 4,445,399 | 5/1984 | Sasaki et al. | 74/603 |
| 4,780,593 | 10/1988 | Kato | 219/137 R |

FOREIGN PATENT DOCUMENTS 2-5944  2/1990  Japan .

*Primary Examiner*—Clifford C. Shaw
*Attorney, Agent, or Firm*—Armstrong, Westerman, Hattori, McLeland & Naughton

[57] ABSTRACT

A method for exactly and effectively correcting an unbalance of a rotating body such as a turbine assembly for a torque converter without worsening a quality of the rotating body. A filler metal is brazed to a welding position by TIG welding while changing an intensity of produced arc by pulse control under an inert gas atmosphere created at a backside of the welding position of the rotating body.

5 Claims, 3 Drawing Sheets

5,278,391

UNBALANCE CORRECTION METHOD FOR ROTATING BODY

DESCRIPTION

1. Technical Field

This invention relates to an unbalance correction method for rotating bodies such as a turbine assembly of a torque converter etc.

2. Background Art

A rotating body such as a turbine assembly for a torque converter will vibrate during high-speed rotation, when its mass is distributed non-uniformly relative to a rotating shaft. In order to avoid such vibration, it is required to make the mass of rotating body uniform relative to the rotating shaft. To this end, an unbalance has been adjusted by making a hole on an unbalanced position of the rotating body to reduce the mass, or by attaching a balance weight to increase the mass. The following four methods have been used in order to increase the mass by attaching the weight:

[1] A balance weight piece is welded by spot welding or projection resistance welding, etc.
[2] A balance weight piece is welded by arc welding etc.
[3] A rivet etc. is crimped as a balance weight.
[4] Built-up welding is applied by arc welding.

In the above methods [1], [2] and [3], however, problems such as an increase in labor cost and unevenness of quality have occurred because of difficulty in automating the welding operation and the necessity of hand work. Although it easy to automate the welding operation in the above method [4], there have been problems due to the necessity for after-processes such as washing and removal work and the contamination of parts of an automatic transmission for a torque converter, for example, which presents a very severe limitation on the contamination of parts. That is, spatter or scale has been produced in the built-up welding carried out by ordinary arc welding, so that it has been necessary to wash and remove the spatter or scale by after-processes. Further, because of a very thin thickness (approx. 1.2 mm) of the turbine assembly at its unbalance position of mass, a penetration-to-backside has occurred due to penetration of mother material of a turbine assembly, or scale (backside-burning) has been produced at a backside of the mother material so as to worsen a quality of the turbine assembly in the built-up welding carried out by ordinary arc welding. Further, there has been a problem that, because of occurrence of the penetration-to-backside or the backside-burning, only a small amount of built-up welding has been possible so that it has been a problem in the art to perform effective correction.

DISCLOSURE OF THE INVENTION

This invention has been made in order to solve the above problems, and an object of the invention is to provide an unbalance correction method for a rotating body, which can be automated easily, does not cause deterioration of a quality of the rotating body, and can perform exact and effective correction.

This invention provides an unbalance correction method for a rotating body, in which an unbalance of the rotating body is corrected by carrying out a built-up welding at an unbalance position of the rotating body, characterized in that a filler metal is brazed to the welding position by means of TIG welding while changing an intensity of the produced arc by pulse control under an inert gas atmosphere created at a backside of a welding position of the rotating body. Since the backside of the welding position of the rotating body is put under the inert gas atmosphere in the present invention, the scale is not produced at the backside of the welding position at the time of the welding.

Since the arc is produced by the pulse control while being changed in its intensity, the molten state of the filler metal is also changed in its intensity so that a temperature rise on a surface at the welding position is controlled. Therefore, the penetration-to-backside due to penetration at the welding position is not produced so that it becomes possible to apply a large amount of padding.

As described above, the back-burning and the penetration-to-backside can be prevented so that the quality of the rotating body is not reduced.

The unbalance is corrected by the brazing and built-up welding of filler metal, so that it becomes easy to automate the welding operation.

Owing to the TIG welding, spatter is not produced so that the washing and removal work are not necessary in the after processes.

DETAILED DESCRIPTION OF THE INVENTION

Figure 1:
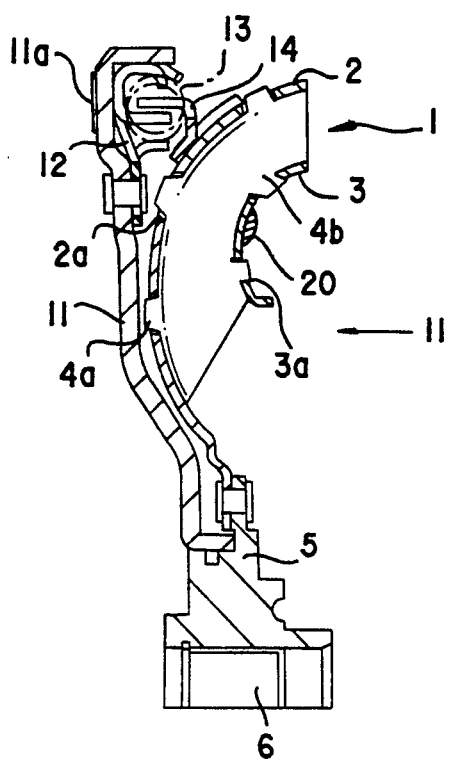
FIG. 1 is a vertical sectional view showing a turbine assembly which has been subjected to unbalance correction according to the method of this invention.
Figure 2:
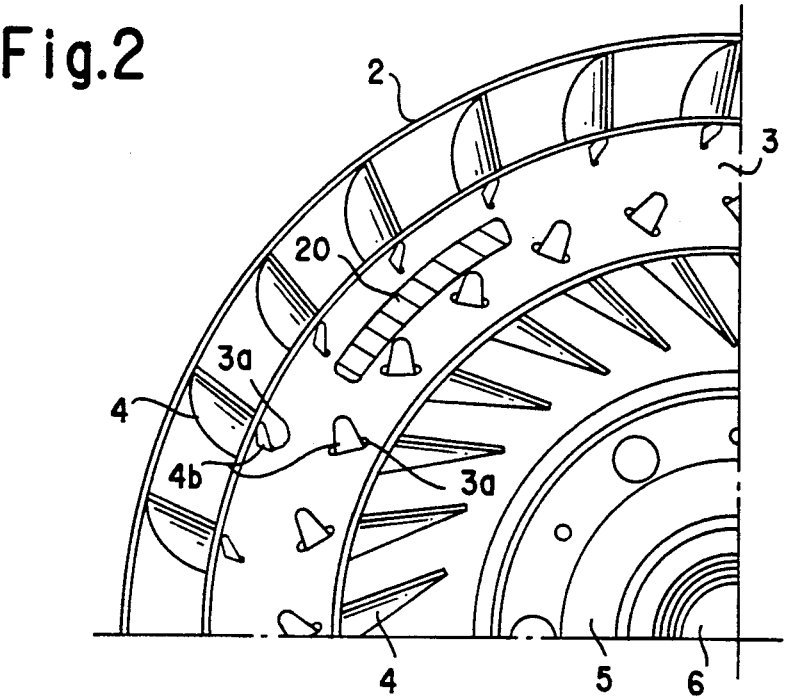
FIG. 2 is a view viewed in a direction of arrow II of FIG. 1.

An embodiment of this invention will be described hereunder with reference to drawings. FIG. 1 is the vertical sectional view showing a turbine assembly which has been subjected to the unbalance correction according to the method of this invention and FIG. 2 is a view in the direction of arrow II of FIG. 1. Here, the turbine assembly refers a structure composed of a transmission mechanism comprising a piston clutch plate 11, a drive plate 12, a torsion spring 13 and a driven plate 14; and of a turbine 1. The turbine 1 is so constructed that plural blades 4 are arranged in a circum - ferential direction between a turbine shell 2 and a core ring 3 and an inner periphery of the turbine shell 2 is secured to a turbine hub 5. Each blade 4 is fixed to the turbine shell 2 and the core ring 3 by inserting tabs 4a and 4b into holes 2a and 3a formed on the turbine shell 2 and the core ring 3, and by bending them. The turbine hub 5 spline fits onto a rotating shaft 6. The turbine assembly is so designed that a torque, which has been transmitted from a front cover (not shown) through a facing 11a to the piston clutch plate 11, is transmitted to the turbine 1 through the drive plate 12, the torsion spring 13 and the driven plate 14.

A balance weight 20 for correcting an unbalance of the turbine assembly is attached to a surface (a surface at a side opposite to the turbine shell 2) of the core ring 3.

Figure 3:
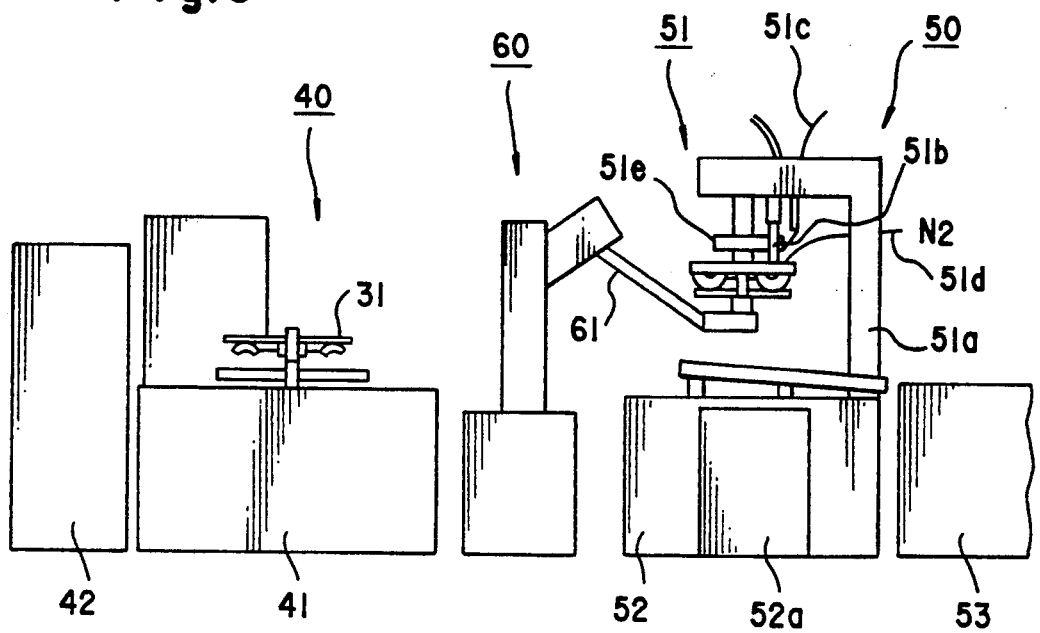
FIG. 3 is a schematic block diagram showing equipment used when carrying out the method of this invention.

The weight 20 is formed by brazing and padding Cu-Si-Mn system copper alloy by means of TIG welding. Other alloys may be used in place of the copper alloy, so far as they have a low melting point, a high specific weight, good compatibility with iron, and similar properties to the above-noted copper alloy. The weight 20 is attached by a device shown in FIG. 3. The device 30 is composed of an unbalance measuring device 40 which measures an unbalance of the turbine assembly (abbreviated to "work" hereunder), a welding device 50 which attaches the weight 20 to an unbalance position of a work 31 by means of the TIG welding, and a handling device 60 which carries the work 31 from the measuring device 40 to the welding device 50. The measuring device 40 includes a body 41 and a measuring unit 42, and is designed to rotate the work 31 on the body 41 to measure its unbalance, and to locate the unbalance position at a specified place. The welding device 50 includes a body 52 having a welding jig 51 and a conveyer 53 for sending out the work 31 after welding. 52a denotes a power supply. The welding jig 51 is so constructed that a torch and Ar supply pipe 51b, a wire 51c forming a filler metal, a N2 supply pipe 51d and a cooling water pipe 51e are secured to a support arm 51a, and is designed to weld a specified spot of the work 31 supported by the handling device 60. The handling device 60 includes an articulated arm 61 and is so constructed as to carry the work 31, which has been measured its unbalanced position by the measuring device 40, to a welding position of the welding device 50 while maintaining the unbalance position located at the specified spot.

A method for installing the weight 20 using the device 30, i.e. an unbalance correction method for the turbine assembly, will be described hereunder. The work 30 is installed on the body 41 of the measuring device 40, its unbalance is measured, and it is turned and positioned as specified. The work 31 subjected to the measurement is carried to a welding position of the welding device 50 under the state where the unbalance position is maintained by the handling device 60. The TIG brazing build-up welding is carried out on the unbalance position of the work 31 by using the welding device 50 so that the weight 20 corresponding to an unbalance correction amount is installed.

Figure 4:
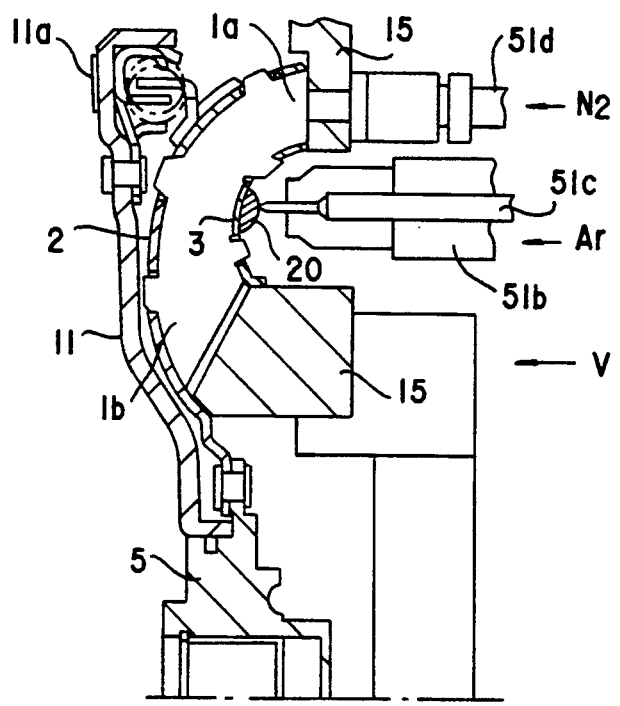
FIG. 4 is a vertical sectional view showing a turbine assembly during an operation.
Figure 5:
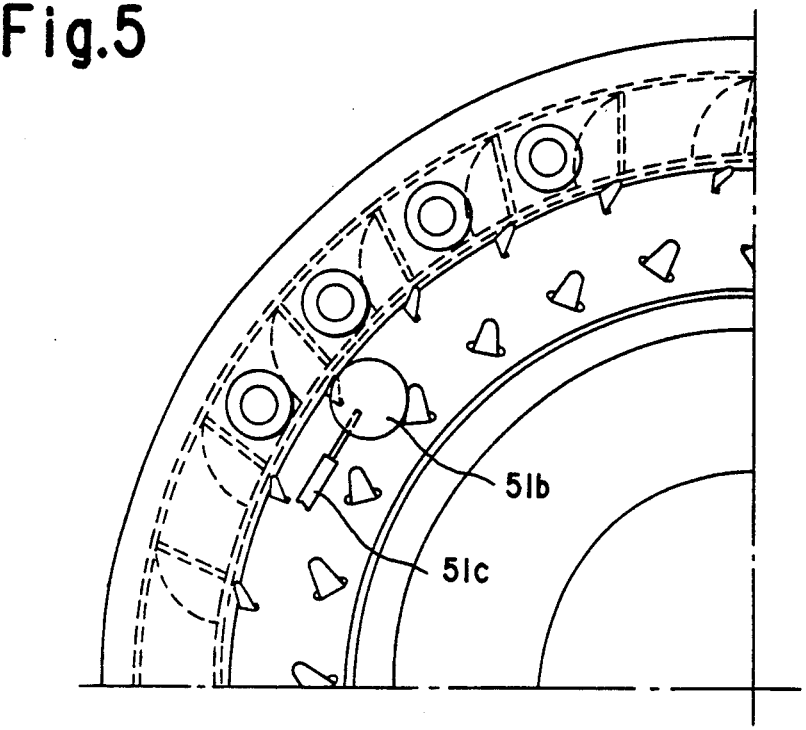
FIG. 5 is a view in a direction of arrow V of FIG. 4.
Figure 6:
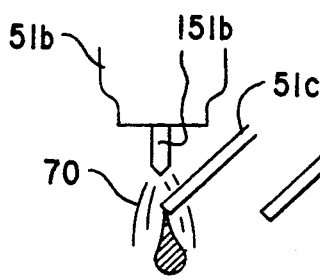
FIG. 6, FIG. 7 and FIG. 8 are diagrams for explaining details of the welding operation.
Figure 7:
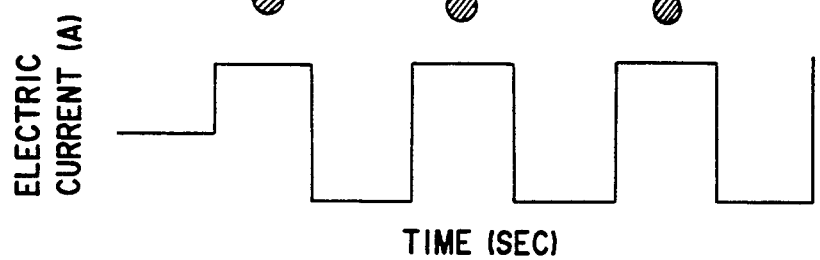
Figure 8:
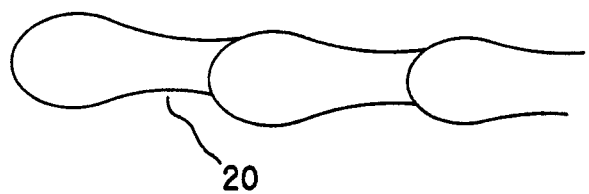

The welding work is carried out as follows, in this instance. First, as shown in FIG. 4, the work 31 is to be positioned by the handling device 60 so as to locate the torch 51b and wire 51c at an unbalance position on the surface of the core ring 3. Incidentally, FIG. 5 is the view viewed in the direction of arrow V of FIG. 4. An opening 1a at radial outside portion of the turbine 1, and an opening 1b at a radial inside portion thereof, are blocked by a sealing material 15 to connect the N2 supply pipe 51d to an inside region of the turbine 1, and prior to this N2 is supplied to fill the inside region of the turbine 1, in order to place the backside of the unbalance position, i.e. the space between the core ring 3 and the shell 2, in an atmosphere of N2. An arc 70 is produced between an electrode 151b at tip end of the torch 51b and the surface of the core ring 3, so that the wire 51c is melted by generated heat so as to be welded to the surface of the core ring 3 under an atmosphere of Ar gas, as shown by FIG. 6. In this instance, the arc 70 is changed in its intensity by controlling an electric current pulse-wise by about 5 Hz for example as shown in FIG. 7, and the wire 51c is thereby made to melt. The wire 51c is supplied to the arc at a specified velocity and a welding amount is controlled by a welding time. The welding amount is sent as a digital signal previously into the handling device 60 from the measuring device 40, and the handling device 60 rotates the work 31 at a specified rotation speed for a period corresponding to the welding time. Accordingly, a circumferential length of the weight 20 will become proportional to the welding amount. The weight 20 can thus be attached to the unbalance position on the surface of the core ring 3 by the procedure described above. FIG. 8 is the view showing a padding state of the weight 20 from above (from the right side of FIG. 4). In FIG. 8, a wide padding portion corresponds to the condition where the wire 51c is melted in FIG. 6. The work 31 after welding is carried to the conveyer 53 by the handling device 60, and then transferred.

In the above-mentioned method, the space between the core ring 3 and the shell 2 is put under the N2 atmosphere so that there is no chance for scale (backside-burning) to be produced. Since the arc 70 is produced by being changed in its intensity by the pulse control, the molten condition of the wire 51c is also changed so that a rise of temperature on the surface of the core ring 3 is controlled. Consequently, the penetration-to-backside due to penetration of the core ring 3 can be avoided and it becomes possible to apply a large amount of padding, so that an effective unbalance correction can be performed. The backside-burning and penetration-to-backside can be avoided, so that prevention of quality reduction of turbine the assembly occurs to which the balance correction is to be performed occurs. Further, the unbalance correction is performed by welding of the wire 51c, so that the automated operation can be accomplished easily, the welding amount is determined by the device 40 and that welding amount is then welded by the same welding device 50 so that an exact unbalance correction can be performed. Moreover, the type of welding used is TIG welding, so that spatter is not produced and so that washing and removal work become unnecessary after the welding processes.

As described above, the present invention provides an unbalance correction method for a rotating a body, in which the unbalance correction is done by performing the built-up welding on a unbalance position of the rotating body (a turbine assembly, for example). The backside the welded spot (e.g., a surface of the core ring 3) of the rotating body (turbine 1) is put under the inert gas (N2 gas) atmosphere, and the filler metal (wire 51c) is brazed to the above spot by the TIG welding in Ar gas while changing the intensity of the produced arc 70 by the above-identified pulse control, so that the method provides the following effects.

(1) The backside of the welded spot of the rotating body is put under the inert gas atmosphere so that scale (backside-burning) can be prevented from being produced.

(2) Since the arc 70 is produced by being changed in its intensity by the pulse control, the molten condition of the filler metal is also changed so that the rise of temperature on the surface of the welding spot is controlled. Consequently, the penetration-to-backside due to the penetration of the welding spot can be avoided, and it becomes possible to apply a large amount of padding, so that an effective unbalance correction can be performed.

(3) The backside-burning and penetration-to-backside can be avoided so that reduction of quality of the turbine assembly to which the balance correction is to be performed can be prevented.

(4) The unbalance correction is performed by welding the filler metal so that the automated operation can be achieved easily.

(5) The type of welding is TIG welding so that spatter is not produced, and the washing and removal work become unnecessary after the welding process.

What is claimed is:

1. An unbalance correction method for correcting an unbalance of a rotating body by adding material at an unbalance position of the rotating body, comprising the steps of:

determining an unbalance position of the rotatable body;

providing a TIG welding means for welding wire to the rotatable body using pulsed TIG welding;

providing a filler metal for brazing by said TIG welding means to the unbalance position;

supplying inert gas to a surface of the rotatable body which is on an opposite side of said unbalance position where the weight is to be added, for preventing scaling of said opposite side during welding at said unbalance position;

using said TIG welding means while changing an intensity of a produced arc thereof by pulse control while said inert gas provides an inert atmosphere at said opposite side of said unbalance position of the rotating body.

2. An unbalance correction method for correcting an unbalance of a rotatable body, comprising the steps of:

providing an unbalance measuring apparatus;

providing a handling device;

providing a welding device having a torch, an inert gas supply pipe, welding jig, and wire supply;

using said unbalance measuring apparatus to determine an unbalance position of the rotatable body and to determine an amount of weight to be added to the unbalance position;

using said handling device to move the rotatable body from said unbalance measuring apparatus to said welding device;

using said inert gas supply pipe to supply inert gas to a surface of the rotatable body which is on an opposite side of said unbalance position where the weight is to be added, for preventing scaling;

using said welding jig to position the rotatable body relative to said torch, and supplying wire from said wire supply while operating said torch to add the amount of weight determined by said unbalance measuring apparatus to said unbalance position determined by said unbalance measuring apparatus.

3. An unbalance correction method as claimed in claim 2, further comprising, during the step of operating said torch, rotating said rotatable body so that the weight added thereto is arc-shaped.

4. An unbalance correction method as claimed in claim 2, wherein in said step of providing a welding device, further providing an Ar supply pipe for said torch, and supplying Ar during welding.

5. An unbalance correction apparatus for correcting an unbalance of a rotatable body, comprising:

an unbalance measuring apparatus for determining an unbalance position of the rotatable body and an amount of weight to be added to the unbalance position;

a welding device having a torch, for welding wire to the unbalanced position of the rotatable body; said welding device having an inert gas supply pipe for supplying inert gas prior to welding to a surface of the rotatable body which is on an opposite side of said unbalance position where the weight is to be added, for preventing scaling, and a welding jig for positioning the rotatable body relative to said torch; and a handling device for moving the rotatable body from said unbalance measuring apparatus to said welding device.

* * * * *